United States Patent [19]

Echtler

[11] 4,415,341

[45] Nov. 15, 1983

[54] GAS, LIQUID CONTACTOR

[75] Inventor: J. Paul Echtler, Pittsburgh, Pa.

[73] Assignee: Conoco Inc., Wilmington, Del.

[21] Appl. No.: 377,650

[22] Filed: May 13, 1982

[51] Int. Cl.³ ............................................. B01D 18/00
[52] U.S. Cl. ........................................ 55/53; 261/77;
366/107; 55/95; 55/196; 55/256
[58] Field of Search ................... 55/95, 52, 53, 54, 44,
55/196, 198, 255, 256; 261/77, 140 A; 210/150;
422/193, 197, 231; 366/101, 106, 107

[56] References Cited

U.S. PATENT DOCUMENTS

| | | | |
|---|---|---|---|
| 2,511,833 | 6/1950 | Beckel et al. | 55/96 |
| 3,452,966 | 7/1969 | Smolski | 261/77 |
| 3,556,989 | 1/1971 | Weber et al. | 422/193 |
| 3,584,042 | 6/1971 | Yavorsky et al. | |
| 3,681,200 | 8/1972 | Ridgway | 261/77 |
| 3,718,691 | 2/1973 | Yavorsky | |
| 3,906,080 | 9/1975 | Gorin et al. | |
| 3,937,787 | 2/1976 | Gorin et al. | |
| 3,937,788 | 2/1976 | Gorin et al. | |
| 4,008,310 | 2/1977 | Gorin | |
| 4,070,445 | 1/1978 | Klunder | |
| 4,099,925 | 7/1978 | Yanagioka et al. | 55/95 |
| 4,375,450 | 3/1983 | Katagiri et al. | 55/196 |

Primary Examiner—Bernard Nozick
Attorney, Agent, or Firm—Dale Lovercheck; William A. Mikesell, Jr.

[57] ABSTRACT

A method of contacting gas and liquid at pressures greater than 200 psig comprising:
  providing container means, said container means being provided with a plurality of conduit means and a plurality of gas inlet means, at least a portion of said gas inlet means extending into said conduit means,
  passing gas at a pressure greater than 200 psig through said gas inlet means into said conduit means,
  passing liquid at a pressure greater than 200 psig into said conduit means, whereby said gas and liquid are contacted.

6 Claims, 7 Drawing Figures

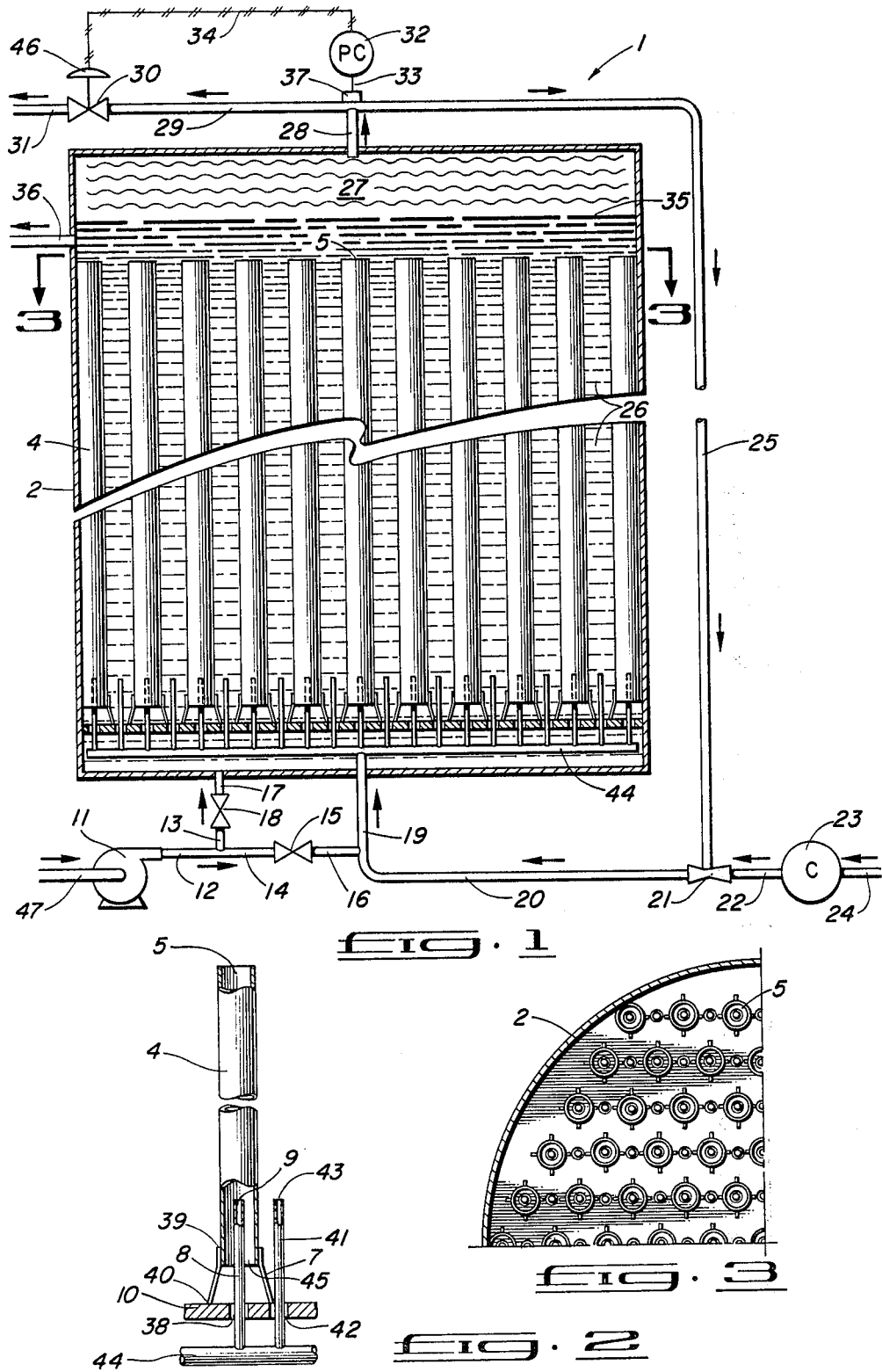

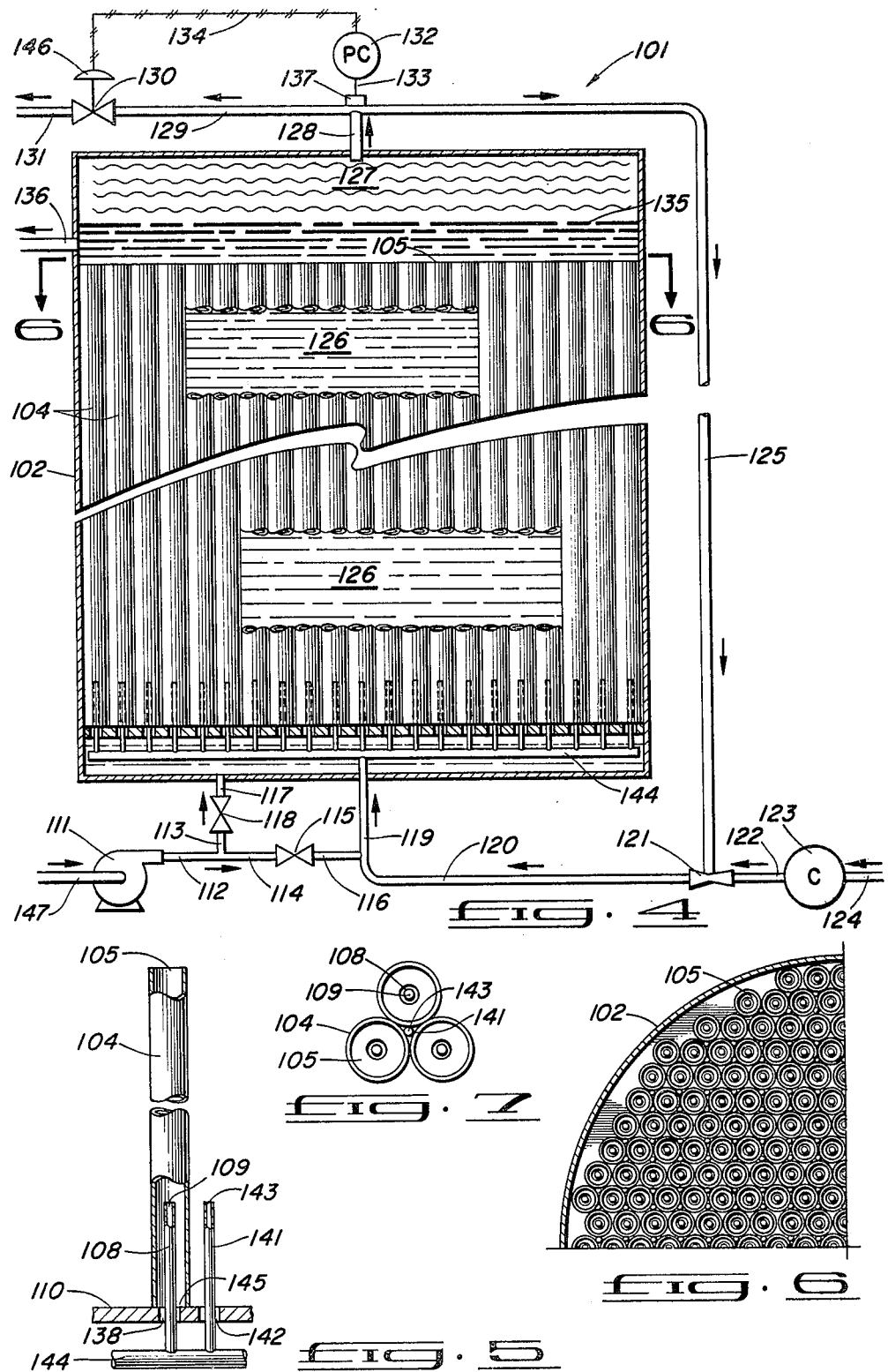

4,415,341

GAS, LIQUID CONTACTOR

BACKGROUND OF THE INVENTION

Klunder U.S. Pat. No. 4,070,445 discloses a process wherein partially reduced potassium thiosulfate in solution with formate passes from a packed bed scrubber to a stirred regenerator 20. The regenerator 20 has reaction zone 21 which operates at conditions of 450° to 550° F. and 400 to 800 psig. Note column 4 lines 33–37.

Ridgway U.S. Pat. No. 3,681,200 discloses a shell and tube fermentor wherein coolant passes on the shell side of the fermentation tubes. Air is fed from beneath the fermentation tubes as shown in FIG. 3.

Gorin U.S. Pat. No. 4,008,310 discloses the recirculating of a solution withdrawn from a scrubbing circuit. This recirculated solution passes through a reducer adapted to withstand elevated temperatures and pressures the reducer vessel may be a stirred tank, a bubble column or a packed bed absorber. Note column 6 lines 17–24.

Yavorsky et al U.S. Pat. No. 3,718,691 discloses a scrubbing process with a stirred regenerator.

Yavorsky et al U.S. Pat. No. 3,584,042 discloses a scrubbing process with provision for regeneration.

Gorin et al U.S. Pat. Nos. 3,937,788 and 3,937,787 each disclose scrubbing processes with regenerators.

Gorin et al U.S. Pat. No. 3,906,080 discloses a scrubbing process.

SUMMARY OF THE INVENTION

A method of contacting gas and liquid at pressures greater than 200 psig comprising:

providing container means, said container means being provided with a plurality of conduit means and a plurality of gas inlet means, at least a portion of said gas inlet means extending into said conduit means, passing gas at a pressure greater than 200 psig through said gas inlet means into said conduit means, passing liquid at a pressure greater than 200 psig into said conduit means, whereby said gas and liquid are contacted.

BRIEF DESCRIPTION OF THE DRAWING

FIG. 1 is a schematic presentation of an embodiment of a high pressure gas liquid contacting system in accordance with the present invention.

FIG. 2 is a partial cross-sectional view of a mixing tube with supporting plate as used in the high pressure gas liquid contactor of FIG. 1.

FIG. 3 is a top view of the regenerator vessel along the line 3—3.

FIG. 4 is a schematic presentation of an embodiment of a high pressure gas liquid contacting system in accordance with the present invention.

FIG. 5 is a partial cross-sectional view of a mixing tube as used in the high pressure gas liquid contactor of FIG. 4.

FIG. 6 is a top view of the regenerator vessel along the line 6—6.

FIG. 7 is an enlarged partial top view along the line 6—6.

DETAILED DESCRIPTION OF THE INVENTION

With more particular references to the drawing wherein the same number refers to the same component in each of the FIGS. 1 through 7 a high pressure gas liquid contactor system is shown generally at 1. The high pressure gas liquid contactor regeneration vessel 2 receives liquid feed through line 17. The regenerator vessel 2 contains mixing tubes 4 having upper openings.

With more particular references to FIG. 2, it is seen that a support plate 10 is provided in the bottom portion of the regenerator vessel 2. The support plate 10 is attached to the spider 7 at point 40 for example by welding. The spider 7 is attached to the mixing tube 4 at point 39 for example by welding. The gas vapor distributor manifold 44 is in fluid flow communication with the gas vapor distributor tubes 8. The gas vapor distributor tubes 8 extend through the apertures 38 in the support plate upwardly into the lower portion of the mixing tubes 4. Each gas vapor distribution tube 8 has an opening 9 in the lower portion of the mixing tube or into which it extends. The gas vapor distributor manifold 44 is connected to a plurality of gas vapor distribution tubes 41 which extend through apertures 42 adjacent to the apertures 38. Each gas distribution tube 41 has an opening 43 above the input opening 45 of the adjacent mixing tube 4. Liquid feed from a scrubber unit passes through line 47 into a pump 11 which forces the liquid feed through line 12. This liquid passes from line 12 into line 13 through valve 18 and into line 17 to be fed into the liquid chamber 26 of the regenerator vessel 2. This flow path is available when the valve 18 is an open position.

When the valve 15 is in an open position, at least a portion of the liquid feed passes from line 12 into line 14 through valve 15 and into line 16 from which it passes into line 19. Line 19 is connected to gas vapor distribution manifold 44. Regenerator gas is fed through line 24 into compressor 23 from which it passes through line 22 through venturi 21 into line 20. Line 20 is connected to line 19 in which the gas feed mixes with the liquid feed. Vapor and gas collect in a vapor space 27 above the liquid level 35 in the regenerator vessel. Vapor and gas pass through the vapor outlet line 28 and into the vapor recycle line 25. The vapor recycle line 25 is connected to venturi 21. Regenerated liquid product is withdrawn through line 36. A portion of the vapor from the vapor outlet line 28 passes through line 29 through valve 30 into vapor output line 31. The throughput of the valve 30 is controlled by the pressure control 32 which is connected by line 34 to a valve actuator 46 the pressure sensor 37 is connected by line 33 to the pressure control 32. The pressure control 32 may be set at a desired set point pressure. The pressure sensor 37 signals the pressure control 32 which compares the sensed pressure with the set point pressure. If the sensed pressure is lower than the set point pressure, the pressure controller 32 signals the valve actuator 46 to adjust the valve 30 to a more closed or restricted position whereby the pressure in the regenerator vessel 2 rises. Similarly, if the pressure sensed by the pressure sensor 37 is higher than the set point pressure, the pressure control 32 signals the valve actuator 46 to open the valve 30 to a less restricted position whereby the pressure in the regenerator vessel 2 is reduced.

In the embodiment shown in FIGS. 4 through 7 a high pressure gas liquid contactor system is shown generally at 101. The high pressure gas liquid contactor regeneration vessel 102 receives liquid feed through line 117. The regenerator vessel 102 contains mixing tubes 104 having upper openings 105.

With more particular references to FIG. 5, it is seen that a support plate 110 is provided in the bottom portion of the regenerator vessel 102. The support plate 110 is attached to the mixing tube 104. The gas vapor distributor manifold 144 is in fluid flow communication with the gas vapor distributor tubes 108. The gas vapor distributor tubes 108 extend through the apertures 138 in the support plate upwardly into the lower portion of the mixing tubes 104. Each gas vapor distribution tube 108 has an opening 109 in the lower portion of the mixing tube or into which it extends. The gas vapor distributor manifold 144 is connected to a plurality of gas vapor distribution tubes 141 which extend through apertures 142 adjacent to the apertures 138. Each gas distribution tube 141 has an opening 143 above the input opening 145 of the adjacent mixing tube 104. Liquid feed from a scrubber unit passes through line 147 into a pump 111 which forces the liquid feed through line 112. This liquid passes from line 112 into line 113 through valve 118 and into line 117 to be fed into the liquid chamber 126 of the regenerator vessel 102. This flow path is available when the valve 118 is an open position.

When the valve 115 is in an open position, at least a portion of the liquid feed passes from line 112 into line 114 through valve 115 and into line 116 from which it passes into line 119. Line 119 is connected to gas vapor distribution manifold 144. Regenerator gas is fed through line 124 into compressor 123 from which it passes through line 122 through venturi 121 into line 120. Line 120 is connected to line 119 in which the gas feed mixes with the liquid feed. Vapor and gas collect in a vapor space 127 above the liquid level 135 in the regenerator vessel. Vapor and gas pass through the vapor outlet line 128 and into the vapor recycle line 125. The vapor recycle line 125 is connected to venturi 121. Regenerated liquid product is withdrawn through line 136. A portion of the vapor from the vapor outlet line 128 passes through line 129 through valve 130 into vapor output line 131. The through-put of the valve 130 is controlled by the pressure control 132 which is connected by line 134 to a valve actuator 146 the pressure sensor 137 is connected by line 133 to the pressure control 132. The pressure control 132 may be set at a desired set point pressure. The pressure sensor 137 signals the pressure control 132 which compares the sensed pressure with the set point pressure. If the sensed pressure is lower than the set point pressure, the pressure controller 132 signals the valve actuator 146 to adjust the valve 130 to a more closed or restricted position whereby the pressure in the regenerator vessel 102 rises. Similarly, if the pressure sensed by the pressure sensor 137 is higher than the set point pressure, the pressure control 132 signals the valve actuator 146 to open the valve 130 to a less restricted position whereby the pressure in the regenerator vessel 102 is reduced.

The embodiments as described are particularly well adapted for high pressure mixing. Sealing of stirred vessels at high pressure is a difficult problem particularly at or above 200 psig. By the present invention, high pressure mixing is provided by the turbulence caused by skin friction on the inner and outer surfaces of tubes 4 and 104.

Having thus described the invention by reference to certain of its preferred embodiments it is respectfully pointed out that embodiments described are illustrative rather than limiting in nature and that many variations and modification are possible within the scope of the present invention. Such variations and modifications may appear obvious and desirable to those skilled in the art upon a review of the foregoing description of preferred embodiments.

Having thus described the invention, I claim:

1. A method of turbulent high pressure mixing of gas and liquid at pressures greater than 200 psig comprising:
   (a) providing container means, said container means being provided with a plurality of conduits and a plurality of gas inlet means, each said gas inlet means comprising an inlet distributor tube having an opening, each said conduit being substantially linear and having a lower portion and an upper portion, each said conduit upper portion including an uppermost opening of said conduit; and positioned within the lower portion thereof each said conduit having at least one of said inlet distributor tube openings, and;
   liquid in said container means being maintained at a level above said upper portion of said conduits whereby liquid is recirculated,
   (b) passing gas at a pressure greater than 200 psig through each said gas inlet means and through each said conduit,
   (c) passing liquid through said each conduit concurrent to the flow of gas at pressure greater than 200 psig and in turbulent flow while within said conduits, whereby said gas and liquid are mixed by the turbulence.

2. The method of claim 1 further comprising
   (d) providing external gas distributor tubes each comprising a distributor tube having an opening positioned between said lower portions of two of more said conduits,
   (e) passing liquid between the outer surfaces of said conduits at pressure greater than 200 psig and in turbulent flow while between the outer surfaces of said conduits,
   (f) passing gas at a pressure greater than 200 psig through said external gas distributor tubes between said conduits whereby liquid and gas are mixed by the turbulence between said conduits,
   (g) withdrawing said liquid from said container means at a point above said conduit means upper portion.

3. The method of claim 1 further comprising providing a supporting plate in said container means said supporting plate being attached to said conduit means, said supporting plate being provided with passageways through which said gas inlet means pass and said liquid passes.

4. The method of claim 1 further comprising providing a vapor outlet line in fluid flow communication to said container means, said vapor outlet line being in fluid flow communication with said gas passing through said gas inlet means.

5. The method of claim 1 wherein said liquid being contacted is spent scrubbing liquid, and said container means is a regeneration container.

6. A method of turbulent high pressure mixing of gas and liquid at pressures greater than 200 psig comprising:
   (a) providing container means, said container means being provided with a plurality of conduits and a plurality of gas tube means, each said gas tube means having an opening said gas tube means comprising inlet distributor tubes and external distributor tubes, each said conduit having a lower portion and an upper portion, said upper portion including an uppermost opening of said conduit; and maintaining liquid in said container means, at a level above said upper portion of said conduits, (b) passing gas at a pressure greater than 200 psig through said inlet distributor tubes and through the lower portion of said conduits, (c) passing liquid through said conduits co-current to the flow of gas at pressure greater than 200 psig, and in turbulent flow while within said conduits, whereby said gas and liquid are mixed by the turbulence, (d) providing said external distributor tubes with the opening of each being between said lower portions of two or more adjacent said conduits, (e) passing liquid between the outer surfaces of said adjacent conduits at pressure greater than 200 psig and in turbulent flow while between the outer surfaces of said conduits, (f) passing gas at a pressure greater than 200 psig through said external distributor tubes and then between said conduits adjacent whereby liquid and gas are mixed by the turbulence between said adjacent conduit means.

* * * * *